United States Patent [19]

Yamada

[11] Patent Number: 4,644,392

[45] Date of Patent: Feb. 17, 1987

[54] METHOD FOR SIMULTANEOUSLY RECORDING A HALFTONE PICTURE PORTION, A LINE DRAWING PORTION WITH A DESIRED SCREEN TINT, AND A BOUNDARY PORTION BETWEEN THEM ON A PLURALITY OF COLOR SEPARATIONS

[75] Inventor: Mitsuhiko Yamada, Kyoto, Japan

[73] Assignee: Dainippon Screen Mfg. Co., Ltd., Kyoto, Japan

[21] Appl. No.: 859,214

[22] Filed: May 2, 1986

Related U.S. Application Data

[63] Continuation of Ser. No. 532,737, Sep. 15, 1983, abandoned.

[30] Foreign Application Priority Data

Oct. 5, 1982 [JP] Japan .................................. 57-175901

[51] Int. Cl.[4] .......................... H04N 1/46; H04N 1/23; H04N 1/32; H04N 1/40
[52] U.S. Cl. ..................................... 358/75; 358/257; 358/283; 358/298
[58] Field of Search ....................... 358/75, 76, 77, 78, 358/79, 80, 280, 283, 284, 75 IJ, 296, 298, 257

[56] References Cited

U.S. PATENT DOCUMENTS

| | | | |
|---|---|---|---|
| 4,151,562 | 4/1979 | Tregay | 358/260 |
| 4,419,691 | 12/1983 | Sing et al. | 358/80 |
| 4,496,989 | 1/1985 | Hirosawa | 358/280 |
| 4,553,172 | 11/1985 | Yamada et al. | 358/75 |

FOREIGN PATENT DOCUMENTS

| | | | |
|---|---|---|---|
| 102825 | 8/1979 | Japan | 358/75 |
| 157255 | 9/1983 | Japan | |

Primary Examiner—James J. Groody
Assistant Examiner—Randall S. Svihla
Attorney, Agent, or Firm—Brumbaugh, Graves, Donohue & Raymond

[57] ABSTRACT

A method for simultaneously recording both a picture and a line drawing used in the recording of a reproduced image having a picture with a variable density tone existing together with a line drawing, the method including separately taking a picture signal and a line drawing signal and converting them to digital signals having equal numbers of bits, more than one bit of the digital signals being given a discrimination bit which allows discrimination between the picture signal and the line drawing signal, giving a line drawing bit which indicates the condition of the line drawing to more than one bit of the line drawing signal, dividing the bits into a picture portion, a line drawing portion, and a boundary portion located between the picture portion and the line drawing portion, forming a dot in the picture portion according to picture information of the original image, preferentially putting out line drawing data in the boundary portion, separately providing dot area percentage data to the line drawing portion, and forming a dot in the line drawing portion according to the dot area percentage data.

4 Claims, 13 Drawing Figures

FIG. 1
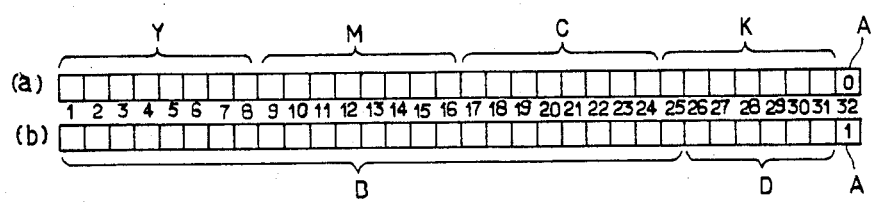
FIG. 2
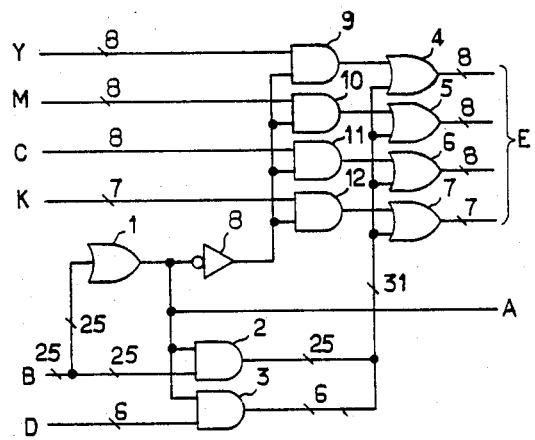
FIG. 3

METHOD FOR SIMULTANEOUSLY RECORDING A HALFTONE PICTURE PORTION, A LINE DRAWING PORTION WITH A DESIRED SCREEN TINT, AND A BOUNDARY PORTION BETWEEN THEM ON A PLURALITY OF COLOR SEPARATIONS

This application is a continuation of application Ser. No. 532,737, filed 9/15/83 now abandoned.

BACKGROUND

The present invention relates to a method utilized in a photomechanical scanner, or the like, for scanning and recording an original image, and more particularly to a method for recording a duplicate image having both a picture portion and a line drawing portion by combining a picture signal having continuous variable density tone with a line drawing signal, representing letters or characters having binary tone such as black and white.

In an image scanning recorder, such as a color scanner, there is a demand for recording a reproduced image of a plurality of original pictures on a single photosensitive material exactly in accordance with a desired layout. Although the said demand has become partially practical, when a continuous variable density tone picture and a graph or letter having binary tone are synthesized to duplicate the desired layout, it is necessary for the binary tone graph or letter to be processed by high resolving power. However, there exists a serious problem in that although it is necessary for the line drawing portion, consisting of fine lines or letters, to be recorded by the high resolving power so as to be reproduced as they appear, the application of the same high resolving power to the picture inevitably invites a considerable increase in the time required for processing. Furthermore, another problem exists in that when the picture is processed by high resolving power exceeding the actual requirement therefor, a magnetic disc memory generally used for the process of layout requires a considerable increase in the capacity thereof, thereby increasing the time for processing and correspondingly resulting in an increase in cost.

In order to solve the above-discussed problem, the applicant of the present invention has already disclosed a method in Japan Patent Application No. 57-39877, corresponding to application numbers U.S. Ser. No. 471,869, now U.S. Pat. No. 4,553,172, GB No. 8306373, DE No. P3308468.3 and FR No. 8304155, which, however, particularly in view of the screen system for expressing heading letters or the like by the screen pattern, still has some weak points in that the configuration of dots of a screen portion is slightly different from that of a corresponding picture portion, and that the screen orientation does not always coincide with the picture portion.

SUMMARY OF THE INVENTION

It is, therefore, an object of the present invention to provide a method for giving the same dot as the picture portion to the screen thereby removing the above-discussed disadvantages. Pursuant to this object, a method for simultaneously recording both the picture and the line drawing is provided. In this method a picture signal and a line drawing signal are taken separately and are respectively converted into digital signals having the same number of bits. A discrimination bit is given to at least one bit of each of the signals so as to discriminate between the picture signal and the line drawing signal, and further, a line drawing bit which indicates the condition of the line drawing is given to more than 1 bit of the line drawing signal. The same length of bits exist together and are divided into a picture portion, a line drawing portion and a boundary portion between the picture and the line drawing. In the picture portion a dot is formed according to the picture information, in the boundary portion line drawing data is preferentially output, and in the line drawing portion a dot is formed according to desired dot area percentage data which is separately given thereto. Accordingly, when the picture and the line drawing are combined on the same film the combining process is carried out by screening the line drawing portion at the desired percentage of dot area, which configuration is the same as the picture portion, thereby improving the finished quality of the printed matters.

BRIEF DESCRIPTION OF THE DRAWINGS

FIG. 1 shows data formats of picture signals and line drawing signals;

FIG. 2 shows a picture element divided for line drawing, letter drawing, etc.;

FIG. 3 shows a circuit for combining a picture signal with line drawing data into the same length of data format;

DESCRIPTION OF THE PREFERRED EMBODIMENTS

Figure 4:
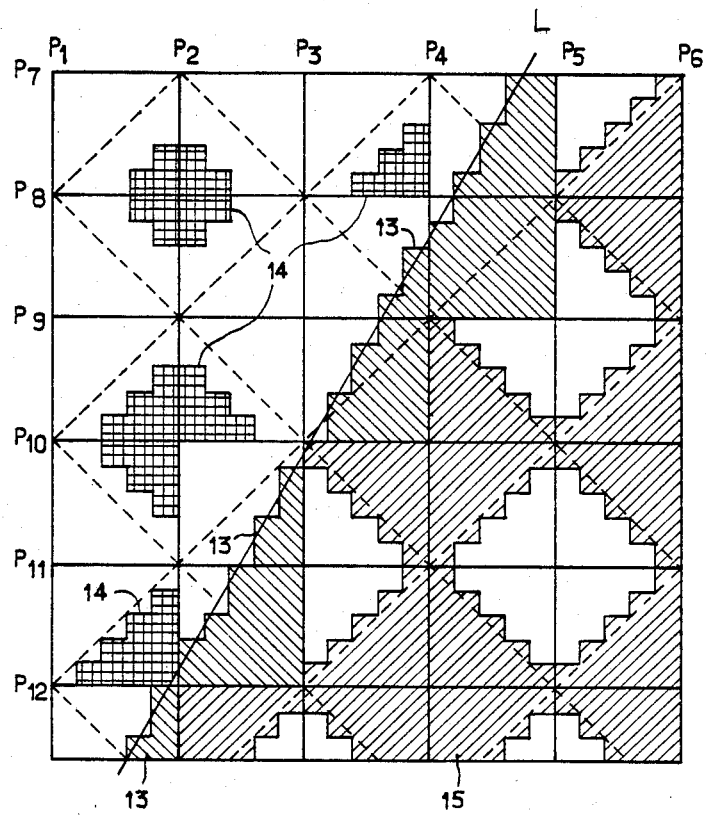
FIG. 4 shows an illustration of an enlarged view of a portion of a reproduced image according to the present invention.

In the input scanning part of an image scanner such as a color scanner for a photomechanical process, to which the present invention is applied, the picture portion and the letter or line drawing portion are separately scanned. For the picture, an electrical signal representing a continuous tone of each color of (B), (G), (R), (glue, green red) is output, while for the line drawing portion a binary signal of 1 bit either "0" or "1" is output. In the computing part, various operations to get a final reproduced image are carried out for the picture signal, which is output as a printing ink signal, and a digital electrical signal representing a continuous tone of (Y), (M), (C), (K) (yellow, magenta, cyan, black) is output as the picture signal. Referring to the line drawing, an electrical signal picked up at a higher resolving power than that of the picture is output as the line drawing signal.

As shown in (a) of FIG. 1, the picture signal has 8 bits, 8 bits and 7 bits respectively for the electrical signals of (Y), (M), (C), (K), and the lowest bit for the electrical signal of (K) is used for a discrimination bit (A) for discriminating between the picture and the line drawing, which is adjusted to "0" in case of a picture. Although there is no problem in taking 8 bits for (K) to which the discrimination bit (A) is added to be 33 bits in total, the present embodiment shows 32 bits in total so that the disc memory system may be efficiently used. The lowest bit of (Y), (M) or (C), can be also used for the discrimination bit (A). The discrimination bit (A) is used for the color whose tone can be cut off in reproducing the printed matter after A/D conversion is made. In the reproducing process the D/A conversion is carried out by adding "0" or "1" to the lowest bit so as to be 8 bits.

As shown in (b) of FIG. 1, the line drawing signal has 25 bits for the boundary signal (B) and 6 bits for the screen tint signal (D) respectively, and the discrimination bit (A) is adjusted to "1". The signal (D) affects screen tint by changing the background dot size in the line drawing, as seen by the white areas to the right of line L in FIG. 4. As shown in FIG. 2, the boundary signal (B) corresponds to a microscopic part corresponding to the position into which a picture element is divided for the line drawing.

FIG. 3 shows an embodiment of a circuit for combining picture signals (Y), (M), (C), (K) with line drawing signals (B), (D). The circuit in FIG. 3 has a picture input and a line drawing input used when the layout process is carried out simultaneously with an accurate registering process between the picture and the line drawing. In the case of the usual layout system using a magnetic disc unit, the picture signal and the line drawing signal are separately memorized in the disc memory and the same composing process as the circuit in FIG. 3 is carried out in the softwear process by a CPU (central process unit). When there is no line drawing portion, all of the 25 bits of the boundary signal (B) representing the microscopic part of the line drawing portion are "0", accordingly, the output of OR circuit (10), having 25 lines of input, is "0", the discrimination bit (A) is "0", and all of the output of AND gates (2), (3) is "0". Thus, the input of OR gates (40), (5), (6), (7) makes the remaining input from the AND gates (9), (10), (11), (12) available. Since the discrimination bit (A) is "0", the output of an inverter (8) is "1", AND gates (9), (10), (11), (12) are opened so as to output the picture signals (Y), (M), (C), (K) as a composed signal (E). When there is a line drawing portion, more than 1 bit of the signal (B) is "1". Accordingly, the output of the OR circuit (1) is "1", and the discrimination bit (A) is "1". Then the output of the inverter (8) is "0", and the AND gates (9), (10), (11) (12) are closed. Since the output of the OR circuit (1) is "1", the AND gates (2), (3) are opened and the line drawing signals (B), (D) are output as the composed signal (E) through OR gates (4), (5), (6), (7).

The composed signal (E) and the discrimination bit (A) make up a total of 32 bits and are memorized in a memory unit or are transmitted to another circuit for further processing.

FIG. 4 illustrates an enlarged view of part of the screening output according to the present invention. That is, an enlarged view showing output in the boundary area where the picture and the line drawing are adjacent to each other. In FIG. 4, each square area limited by lines (P1) thru (P12) is one picture element on the output film corresponding to a picture element of a picture. The areas (14) in FIG. 4 each represent an output dot of the picture portion of the reproduced image. The different shapes and sizes of the dots represent the graduation of color by collection of the large and small dots. For example, where large dots are collected the picture element is reproduced dark, while where the small dots are collected it is reproduced light. The line (L) is a boundary between the picture and the line drawing of an original image. The line (L) becomes a reproduced line that is shown as areas (13) of FIG. 4. Consequently, in the picture element on the boundary, the pattern is recorded on the output film using the resolving power as used for line drawing. To the right of the line (L) in FIG. 4 is shown a case in which all of the reproduced portion is line drawing. The area (15) illustrated in FIG. 4 has a screen tint pattern wherein about 60% of the area (15) is exposed so that it has line drawing. The percentage of area (15) which is exposed so that it has line drawing determines the density of the line drawing. The white areas to the right of line (L) represent unexposed areas in the line drawing. As the line drawing dot area percentage decreases, the size of the white areas increases causing the line drawing to have a lighter tint.

Figure 5:
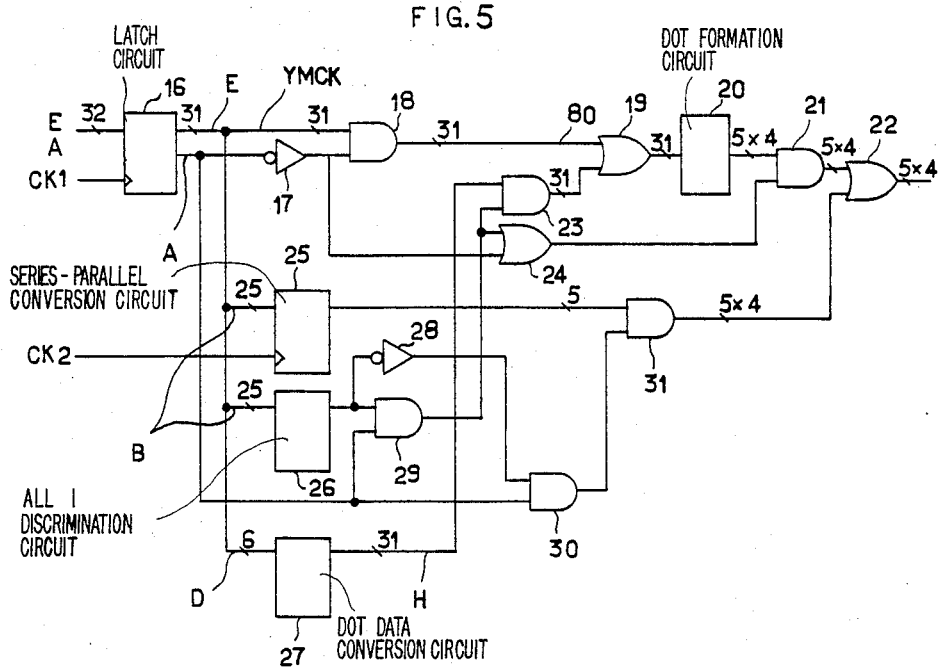
FIG. 5 shows a circuit for practicing the present invention.
Figure 6:
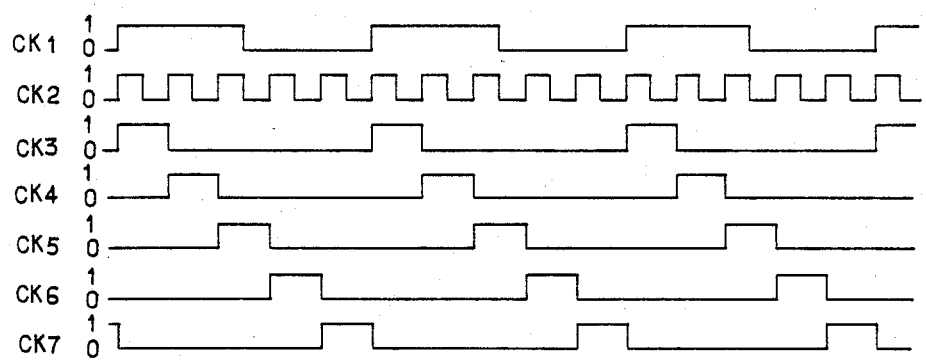
FIG. 6 shows output timing.

FIG. 5 is a circuit diagram showing the above described embodiment. The composed signal (E) and the discrimination bit (A) are output to a latch circuit (16) for the 32 bits which are latched by a first transition signal (CK1) changing from "0" to "1" in FIG. 6. When the composed signal (E) is a picture signal, the discrimination bit (A) is "0", an inverter (17) outputs "1", causing an AND gate (18) to open, so that the picture signal is input to a dot formation circuit (20) through an OR gate (19). The dot formation circuit (20) outputs, as represented by the area (14) of FIG. 4, according to any of the 8 bits, 8 bits, 8 bits and 7 bits of the respective picture signals (Y), (M), (C), (K), and the output is carried out through an AND gate (21) and an OR gate (22). Since the discrimination bit (A) is "0", the other input terminal signal of OR gate 19 is "0" according to AND gates (29), (23). The gate signal of the AND gate (21) is "1", since the output "1" of the inverter (17) is transmitted thereto through an OR gate (24). The other input terminal signal of the OR gate (22) is "0", since the output of AND gates (30), (31) is "0" according to the discrimination bit (A) which is "0".

Then, when the composed signal (E) is a line drawing signal, the discrimination bit (A) is "1", and the inverter (17) outputs "0" and closes AND gate (18).

When the discrimination bit (A) is "1" and all of the bits of the boundary signal (B) are "1", the tint laying signal (D) is output to a dot data conversion circuit (27). An output tint laying data (H) of 31 bits is input to the dot formation circuit (20) through the AND gate (23) and the OR gate (19), and output corresponding to any of the dot signals (Y), (M), (C), (K) is taken, which is output through the AND gate (21) as represented by the area (15) of FIG. 4. The other gate signal of the AND gate (23) is "1" through the AND circuit (29), since the discrimination bit (A) is "1" and the output of ALL 1 discrimintion circuit (16) is "1"

The input terminal signal (80) of the OR gate (19) is "0", since the discrimination bit (A) is "1" which becomes "0" through the inverter (17) to pass through the AND gate (18). The gate signal of the AND gate (21) passing through the AND circuit (29) and the OR circuit (24) is "1", since the discrimination circuit (26) is "1". The gate signal of the OR gate (22) passing through and AND gates (30), (31) is "0", since the output of the ALL 1 discrimination circuit (21) is "1" and inverted to "0" through the inverter (28).

When the discrimination bit (A) is "1" and more than 1 bit of all 25 bits of the boundary signal (B) is "0" or "1", since the output of the ALL 1 discrmination circuit (26) is "0", the OR gate (24) is input through the AND circuit (29), the "1" of the discrimination bit (A) is inverted to "0" through the inverter (17), and in the same manner, the OR gate (24) is input. The input of the AND gate (21) is "0" closing the same gate, and there is no output from the dot formation circuit (20). Since the output of the ALL 1 discrimination circuit (26) is "0" and the output of the inverter (28) is "1", and further that the discrimination bit (A) is "1", the "1" is input to the AND gate (31) through the AND circuit (30) and the output of a series parallel conversion circuit (25) is output through the AND gate (31) and OR gate (22). Thus the area (13) of the FIG. 4 is output. The output of the series parallel conversion circuit (25) must be output the manner of 5 rows each of 5 bits divided into five time intervals.

Figure 7:
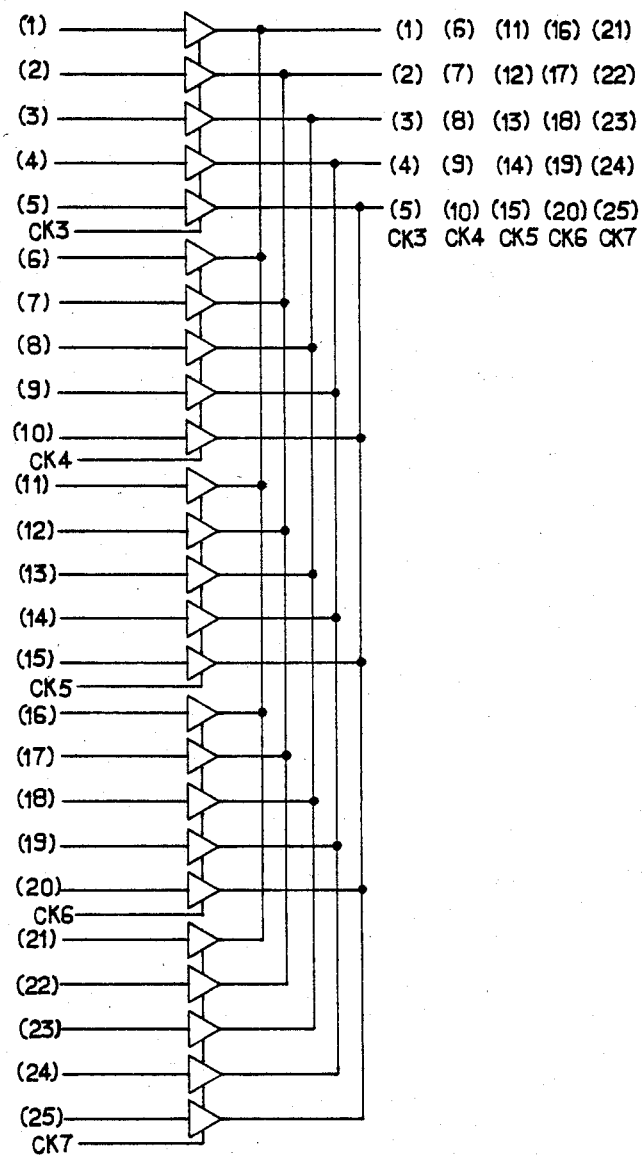
FIG. 7 shows series parallel conversion.

FIG. 7 shows an embodiment illustrating a part of the series parallel conversion circuit (25) which converts the 25 bits shown in (b) of FIG. 1 to 5 rows each of 5 bits shown in FIG. 2. The circuit (25) comprises a buffer circuit having tri-state outputs. (CK2) which is generated by PLL circuit synchronizing with a clock (CK1) shown in FIG. 6, generates 5 kinds of clocks (CK3) thru (CK7) by a counter circuit. The clocks (CK3) thru (CK7) enter in the buffer circuit shown in FIG. 7, and when each of the clocks is "1", the buffer transmits the input to the output terminal, and the area (13) of FIG. 4 is output through the AND gate (31) and the OR gate (22).

When the picture signals (Y), (M), (C), (K) are input, the dot formation circuit (20) outputs 5 rows each of 5 bits divided into five time intervals in the same manner as the boundary portion so that the dot may correspond to the information of each color separated image. Thus, in the present embodiment, as the picture signals and the tint laying data (H), which corresponds to the picture signal taken from the tint laying signal (D), are input to the same dot information circuit (20), the configuration of the dot of the picture portion is the same as the halftone portion.

The dot data conversion circuit (27) comprises a memory unit such as a random access memory (RAM) or a read only memory (ROM), etc., and the tint laying data is input beforehand. In the case of tint laying, the same tint laying on one drawing portion is carried out throughout the line drawing portion. The selection of the area for tint laying is fixedly made by the address on the input original copy or by the address on the output film. Accordingly, it is permitted to give tint laying data to a certain area before the recording film is separately prepared. 6 bits of the tint laying signal (D) are used for discriminating said area, and 64 kinds of output states can be designated by the 6 bit signal.

Figure 8:
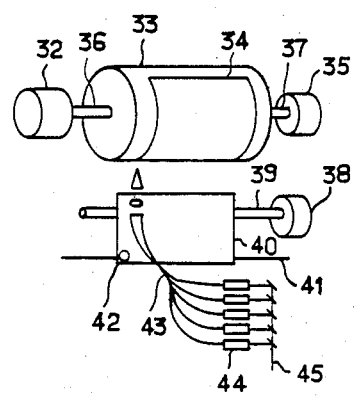
FIG. 8 shows a perspective view of the recording system.

FIG. 8 shows an example of an output unit of a color scanner. The film (34) is loaded on a rotating drum (33), which is provided with a drive motor (32), and a rotary encoder (35) generates pulses corresponding to the angle of rotation of the drum (33). The recording head (40) moves on a feed screw (39) connected to a sub-scanning drive motor (38) and generates pulse corresponding to the moving distance of the sub-scanning direction by a linear encoder (41) provided parallel to the feed screw (39) and by a linear encoder detector (42) provided on the recording head (40). A laser beam (45) is branched into plural optical paths by a half mirror group, and, passes through optical fibers (43) having shutters (44) to expose the film (34).

Figure 9:
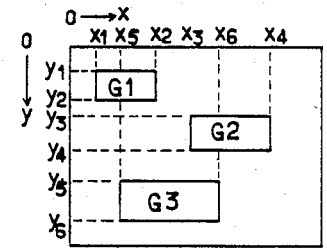
FIG. 9 shows a line drawing area on the output film.

FIG. 9 shows an example of line drawing area on the film (34) of FIG. 8. In order to discriminate the areas (G1), (G2), (G3) on the film (34), the following process is employed. In the direction of rotation, the pulse generated by the rotary encoder (34) is counted, and which value is put as "y". The counting of pulse is carried out by resetting the counter to "0" for every rotation at the starting position in the direction of rotation. In a like manner, the pulse generated by the linear encoder detector (42) is counted, and which value is put as "x". Thus, a position being in the process of exposure at a certain moment is expressed by (x, y). Then supposing that the area (G1) is surrounded by straight lines expressed by equations $y=y1$, $y=y2$, $x=x1$, $x=x2$ respectively, said (G1) is at that moment, limited by equations $Y1 \leq y \leq y2$ and $x1 \leq x \leq x2$, when a tint laying data (D1) of the area (G1) is input to (D) of FIG. 3.

Figure 11:
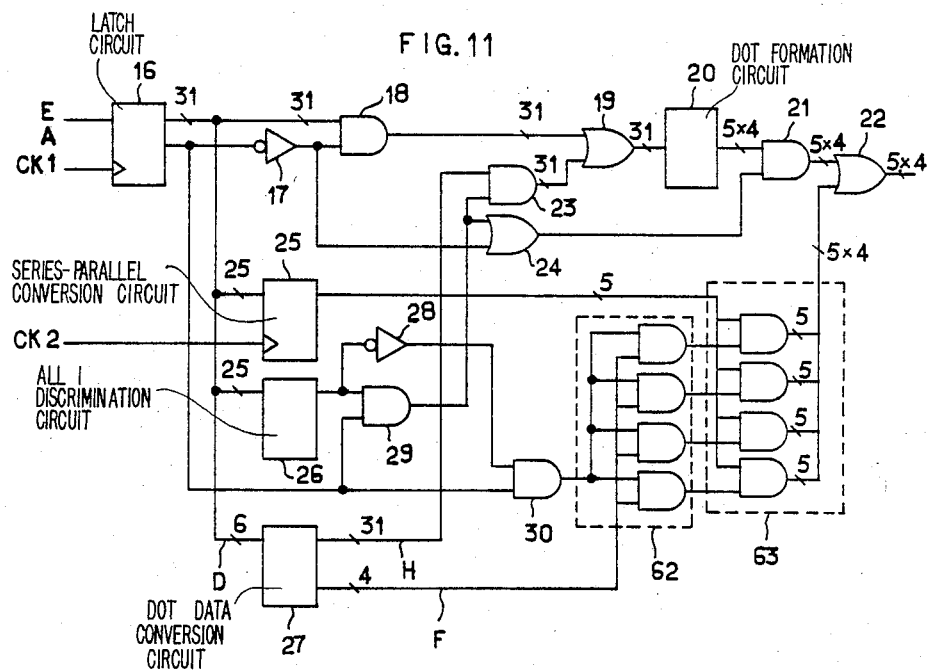
FIG. 11 shows a circuit for improving the boundary portion of the line drawing.
Figure 10:
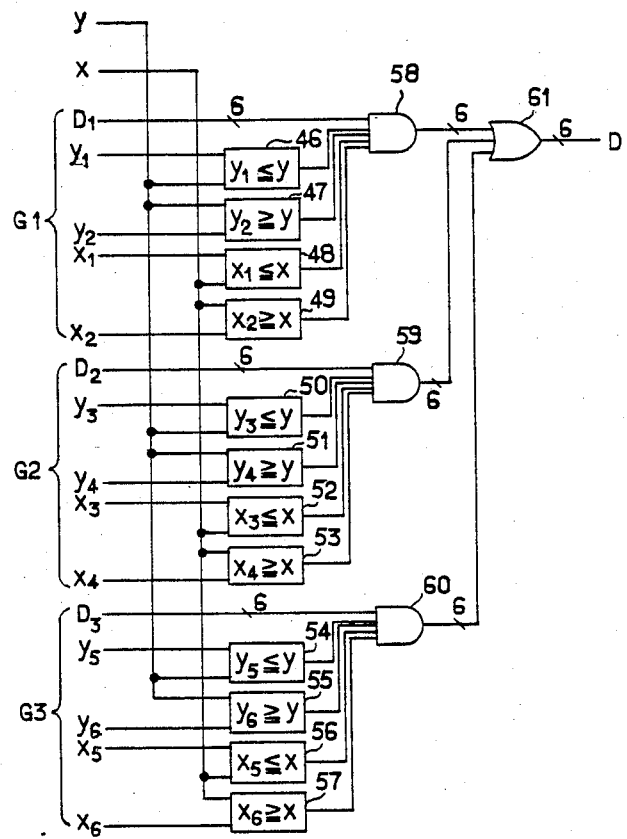
FIG. 10 shows a detecting system of the line drawing area.

FIG. 10 shows an embodiment of a circuit which gives the tint laying signal corresponding to the area. The circuit comprises comparators (46) thru (57), AND gates (58) thru (60) having 4 lines of gate input, and an OR gate (61). When the area (G1) is exposed, every output of comparators (46), (47), (48), (49) is "1", the AND gate (58) having 4 lines of gate input is opened, and the tint laying signal (D1) of the area (G1) is transmitted to (D) of FIG. 3 through the AND gate (58) and the OR gate (61). The foregoing actuation is the same for the areas (G2) and (G3). In this respect, if no further actuation is provided, there remains a problem that the boundary portion is given to all of (Y), (M), (C), (K) as an ON-OFF signal of exposure light of 5 bits which is output from the series parallel conversion circuit (25) of FIG. 5, and accordingly the boundary portion is exclusively printed with all of the ink to be blacked irrespective of the tint laying signal (D). Therefore, the circuits arranged behind the series parallel conversion circuit (25) are separated into 4 color separation signals as shown in FIG. 11 so that ON-OFF control on the whole may be carried out by each separation. A method for getting a control signal (F) of said 4 separations can be achieved by adding 4 bits to the dot data conversion circuit (27) for predetermination of the control signal (F) so that a color separation may be printed on the boundary portion corresponding to the color separation which is instructed to be printed, for example, at 1% of dot of (Y), (M), (C), (K).

Figure 12:
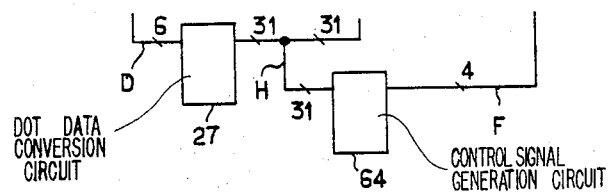
FIG. 12 shows a circuit for taking the boundary portion of line drawing from the data of line drawing portion.

Another method for getting the control signal (F) is shown in FIG. 12 modified from FIG. 11, wherein the signal (F) is taken by adding the output tint laying data (H) of the dot data conversion circuit (27) to the input of a control signal generation circuit (64) having 4 separations.

Figure 13:
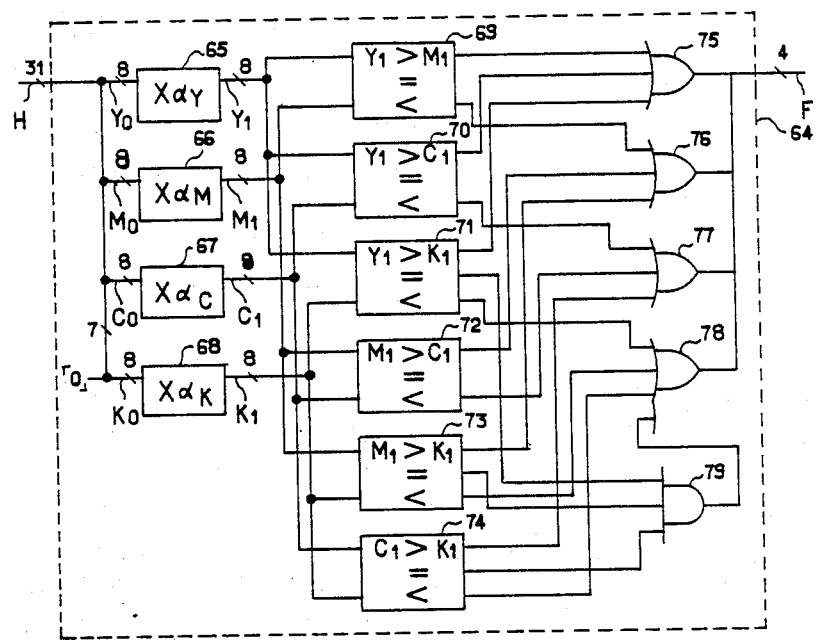
FIG. 13 shows a circuit for generating a control signal of the boundary portion for color separated areas.

FIG. 13 is an embodiment of the control signal generation circuit (64) having 4 separations, wherein the dot area percentage data (H) is branched to (Yo), (Mo), (Co), (Ko). (Ko) is adjusted to be 8 bits by adding "0" to the lowest bit thereof since (Ko) remains 7 bits as described above, and said (Yo), (Mo), (Co), (Ko) pass through multipliers (65) thru (68), and (Y1), (M1), (C1), (K1) through comparators (69) thru (740, and further the output thereof through OR circuits (75) thru (78) or through AND circuit (79). Thus the control signal (F) of the 4 color separations can be taken so as to print the boundary portion corresponding to the state of the tint laying in the line drawing portion.

Thus, according to the foregoing embodiments, whether the layout process is carried out after all of the pattern informations are once memorized into a large capacity memory unit such as disc memory or another method is employed wherein a compound input is included for the real time process or wherein a composed image is formed on the recording film by the reciprocating actuation of an input member, the same technical advantage is achieved so far as the format of each date is processed in the same manner as shown in FIG. 1.

It will be evident to those skilled in the art that the present invention is not limited to the details of the foregoing illustrative embodiments, and that the present invention may be embodied in other specific forms without departing from the essential attributes thereof, and it is therefore desired that the foregoing embodiments be considered in all respects as illustrative and not restrictive, reference being made to the appended claims, rather than to the foregoing description, and all changes which come with the meaning and range of equivalency of the claims are therefore intended to be embraced therein.

What is claimed is:

1. A method for simultaneously recording a line drawing portion and a picture portion in a reproduced image of an original image containing both a line drawing portion and a continuous-tone picture portion, comprising the steps of:

separately generating a picture signal and a line drawing signal from the original image;

converting said picture signal and said line drawing signal into a digital picture signal and a digital line drawing signal, respectively, each said digital signal representing one pixel of the reproduced image with an equal number of bits;

assigning at least one bit of each said digital signal to be a discrimination bit indicating whether each said digital signal is a digital picture signal or a digital line drawing signal;

assigning more than one bit of said digital line drawing signal to be a boundary signal representing the line drawing portion of said reproduced image in a boundary portion of said line drawing portion adjacent said picture portion of said reproduced image;

assigning more than one bit of said digital line drawing signal to be a screen tint signal representing a screen tint to be recorded in said line drawing portion;

performing a first decoding operation on said at least one discrimination bit of said digital picture signal and said digital line drawing signal to distinguish between said digital picture signal and said digital line drawing signal;

performing a second decoding operation on said boundary signal of said digital line drawing signal when said digital line drawing signal is distinguished in said first decoding operation to distinguish between a digital signal for said boundary portion of said reproduced image and a digital signal for said line drawing portion of said reproduced image.

recording a dot in said picture portion of said reproduced image in accordance with picture information of said continuous-tone picture portion of said original image when said digital picture signal is distinguished in said first decoding operation;

recording line drawing information in said boundary portion of said reproduced image in accordance with line drawing information of said line drawing portion of said original image when said digital signal for said boundary portion is distinguished in said second decoding operating; and recording a dot in said line drawing portion of said reproduced image in accordance with said screen tint signal when said digital signal for said line drawing portion of said reproduced image is distinguished in said second decoding operation.

2. A method as defined in claim 1, wherein said reproduced image is recorded as a plurality of individual color separations, further comprising the step of controlling on which of said individual color separations said line drawing information is recorded in said boundary portion.

3. A method as defined in claim 2, wherein said controlling step is performed in accordance with control information assigned to said bits of said digital line drawing signal otherwise assigned to be said screen tint signal.

4. A method as defined in claim 1, wherein said reproduced image is recorded on an output film comprising a plurality of areas in which line drawing portions are to be recorded, said line drawing portions to be recorded in each of said areas with a desired screen tint; and wherein said screen tint signal is changed in accordance with the position of each of said areas on said output film so that the line drawing portions in each of said areas are recorded with the desired screen tint for that particular area.

* * * * *